LOGICAL CIRCUIT

Filed Dec. 30, 1957

3 Sheets-Sheet 1

INVENTOR.

Richard K. Richards

BY

Norman C. Fulmer

Att'y.

INVENTOR.
Richard K. Richards
BY
Norman C. Fulmer
Att'y.

Jan. 9, 1962 R. K. RICHARDS 3,016,466

LOGICAL CIRCUIT

Filed Dec. 30, 1957 3 Sheets-Sheet 3

INVENTOR.

Richard K. Richards

BY Norman C. Fulmer

Att'y.

3,016,466
LOGICAL CIRCUIT
Richard K. Richards, Old Troy Road, Wappingers Falls, N.Y.
Filed Dec. 30, 1957, Ser. No. 705,991
4 Claims. (Cl. 307—88.5)

This invention relates to electrical circuits for performing the logical functions of "or," "exclusive or," "and," and "not" as required in digital computers and other digital machines. More specifically, it relates to a generalized circuit for performing any combination of these logical functions, and is particularly adapted to a mode of operation known as "current-switching."

A large number of diffierent circuits known to the prior art are useful in performing the logical functions of "or," "exclusive or," "and," and "not." However, most of these circuits have speed limitations which render them unsuitable for use in very high speed digital computers where the pulse repetition rate may be 10 megacycles per second or higher. One of the major factors which has limited the pulse repetition rate in these circuits, is the voltage excursion required at various points in the circuits. Even with very carefully designed circuits there is always an appreciable amount of stray wiring capacitance in addition to any intended capacitances. In order to charge these capacitances to a relatively high voltage in the very short times available for 10 megacycle pulsed operation, an impractically large current-handling ability is required of the tubes, transistors, or other components that are used. To avoid the speed limitations imposed by large voltage swings, a mode of operation commonly called the "current-switching" mode has been developed. In the current-switching mode of operation, the voltage swing at any point in the circuit is relatively small, and may be only a fraction of a volt. Instead of using voltage changes, the currents in such a circuit are directed into various paths under the control of the binary signals, and these currents are combined in various logical arrangements. The current-switching mode of operation is described in a paper titled "Millimicrosecond Transistor Current Switching Techniques" by H. S. Yourke and E. J. Slobodzinski. This paper was published in the Proceedings of the Western Joint Computer Conference held in February 1957 at Los Angeles (see pages 68–72), and also was published in the "IRE Transactions on Circuit Theory," vol. CT-4, No. 3, September 1957, pages 236–240.

In the discussion to follow, conventional Boolean algebra notation will be used to describe the logical functions. In this algebra the "or" function will be represented by a "sum" such as $A+B$; the "and" function will be represented by a "product" such as AB; and the "not" function will be represented by a bar over a symbol such as $\bar{A}$. A more complete discussion of Boolean algebra as applied to logical circuits is contained in the book "Arithmetic Operations in Digital Computers," by R. K. Richards, published by the D. Van Nostrand Company in 1955.

A difficulty with the current-switching circuits known to the prior art is that only a relatively simple logical function can be accomplished in a single stage, or "level," of switching. With the previously known circuits the only functions that can be performed in a single stage of switching are the elementary "and" function, the elementary "or" function, or the function of $A\bar{B}+\bar{A}B$, which is commonly called the "exclusive or" function. The inverse ("not" function) of any one or more of the input signals can be used at the input terminals, and the inverse of the elementary function is available at a separate output terminal, but more complex combinations of functions have required the use of two or more successive levels of switching. The use of more than one level is often objectionable because the time delay which thereby occurs between the application of the binary signals at the input terminals of the switching circuit and the appearance of the desired signals at the output terminals.

An object of this invention is to provide a single-level current switching logical circuit which will perform any combination of logical functions.

Another object is to provide a single-level current-switching circuit which can be adapted to any complex logical function in an easy and straightforward manner.

Still another object is to provide a single-level current-switching circuit which, for any given logical combination, requires a minimum number of components.

An additional object of this invention is to provide a single-level current-switching circuit wherein the amplitude of the output signals is in pure binary form (only two different voltage amplitudes) regardless of the combination of the binary values of the input signals.

With regard to current-switching characteristics, the basic principle of current-switching employed in the circuit of this invention is substantially the same as in current switching circuits of the prior art. The novelty of this invention lies in the manner in which component basic current-switching circuits, each including one or more main transistors, are combined in a one-level arrangement in which the transistors are energized by input signals in accordance with a Boolean expansion that represents and is equivalent to, a desired output signal, each element of the expansion serving to determine the number of transistors in a corresponding component circuit and to identify the logical input signal to each transistor in said component circuit.

The various objects mentioned above, as well as other objects of the invention, are achieved by selectively arranging the basic current-switching component circuits according to the Boolean expansions of the desired output signals, as indicated in certain examples herein, which are disclosed and explained in the following description and claims and which are illustrated in the drawings.

The current amplitudes mentioned in the following description are for the purpose of illustration only and can be varied over wide limits provided the ratio of currents in the various parts of the circuit is the same as the ratio of the mentioned currents.

Figure 1:
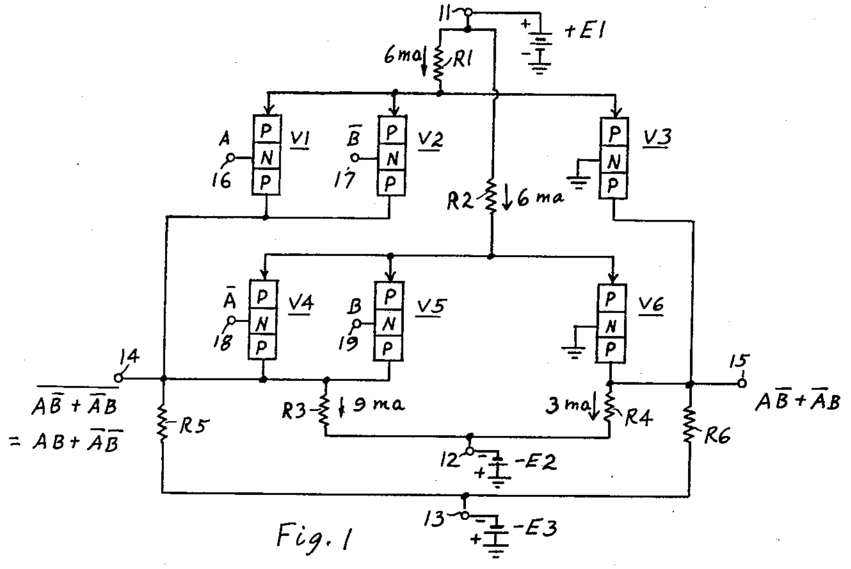
FIG. 1 shows a current-switching logical circuit, known to the prior art, which is capable of generating the "exclusive or" function, $A\bar{B}+\bar{A}B$.

The circuit of FIG. 1 comprises six PNP transistors, V1, V2, V3, V4, V5, and V6. The emitters of V1, V2, and V3 are connected together, the common connection being connected to a constant-current source of 6 milliamperes. The constant-current source is shown to comprise a resistor R1 connected to a terminal 11 to which a constant voltage source, such as a battery having a voltage +E1, is connected. The magnitude of +E1 is chosen to be relatively great in comparison with the signal voltages so that the current drawn by the circuit path of R1 is approximately a constant current. The emitters of V4, V5, and V6 are similarly connected together and are connected to a second constant-current source of 6 milliamperes which in this case comprises a resistor R2 connected to the terminal 11. The collectors of V1, V2, V4, and V5 are connected together and are also connected to a negative-polarity constant-current source of 9 milliamperes. In the figure this constant-currrent source is shown as comprising a resistor R3 connected to a source of a relatively large value of negative voltage −E2 at a terminal 12. The common collector connection is also connected through a resistor R5 to a source of bias voltage of magnitude −E3 at terminal 13. The common collector connection is also connected to an output terminal 14. The collectors of V3 and V6 are similarly connected together and are connected to a negative constant-current source of 3 milliamperes which in this case comprises a resistor R4 connected to the terminal 12. The collectors of V3 and V6 are also connected to an output terminal 15 and through a resistor R6 to the source of bias voltage −E3 at terminal 13. The bases of V3 and V6 are connected to ground, and the bases of V1, V2, V4, and V5 are connected to input terminals 16, 17, 18, and 19, respectively, to which binary input signals designated A, $\overline{B}$, $\overline{A}$, and B, respectively, are applied. The remaining terminals of the voltage sources E1, E2 and E3 are connected to ground.

Attention now is directed to V1, V2, and V3 in FIG. 1. Because of the low forward emitter-to-base resistance of V3, the potential of the emitters of the three transistors cannot rise more than a fraction of a volt positive with respect to ground. Therefore, relatively small positive potentials applied at input terminals 16 and 17 are sufficient to cut off V1 and V2 with the result that the entire amount of current through R1 is directed through the emitter of V3. When the base of a transistor is grounded as in the case with V3, the collector current is approximately equal to the emitter current. The current of 6 milliamperes then flows through V3 to the junction of the collectors of V3 and V6. On the other hand, if the potential of one or the other of terminals 16 and 17 is made negative by a small amount, the entire 6 milliamperes from R1 is directed to V1 or V2, or both, as the case may be. Assume that a negative input voltage is applied at terminal 16. Only a small voltage is required to redirect the current because of the low forward emitter-to-base voltage drop in V1. This low voltage drop causes the potential of the junction of the three emitters to be carried more negative than ground potential with the result that V3 becomes cut off. The three transistors V4, V5, and V6 function in an analogous manner.

Consider now the junction of the collectors of V1, V2, V4, and V5. Since the net current flow to this point in the circuit must be zero, the current through R5 must make up for any unbalance as created by the various constant-current sources that may be connected to this point either directly or through the transistors. Specifically, if one but not both of the 6 milliampere currents is switched to this point under control of the input signals, there must be a net of 3 milliamperes flowing from terminal 13 through R5 to the point in question so that this 3 milliampere current, together with the 6 milliamperes, will balance the 9 milliamperes flowing from the point through R3 to terminal 12. Current flow in this direction through R5 will create a potential at the point and at the output terminal 14 which is negative with respect to −E3. If both of the 6 milliampere currents are directed to the point, the net current through R5 will again be 3 milliamperes, but in the opposite direction with the result that the output voltage will be positive with respect to −E3. The resistance value of R5 is normally relatively small so that the output voltage swing is only a fraction of a volt but is nevertheless sufficient to serve as the input signal for another circuit of the current-switching type.

Similarly, the potential at the junction of the collectors of V3 and V6 and at output terminal 15 is negative or positive with respect to −E3 in accordance with whether none or one, respectively, of the 6 milliampere currents is switched to this junction point through V3 and V6.

With the convention that 1's and 0's are represented by relatively positive and negative potentials, respectively, it may be observed from the above description that the output potential at terminal 15 will be 1 when A is 1 and B is 0 (because V1 and V2 will both be cut off, thereby directing the 6 milliampere current from R1 through V3) or when A is 0 and B is 1 (because V4 and V5 will be both cut off thereby directing the 6 milliampere current from R2 through V6). The output signal at terminal 15 is therefore $A\overline{B}+\overline{A}B$. This function is commonly called the "exclusive or" function because one "or" the other, but not both, of the input signals must be 1 for the output signal to be 1. The output signal at terminal 14 is the inverse of the "exclusive or" function, which is $\overline{A\overline{B}+\overline{A}B}=AB+\overline{A}\overline{B}$.

Now consider the function $AB+AC$. In view of the similarity of the Boolean notation between this function and the "exclusive or" function $A\overline{B}+\overline{A}B$, it might seem that the circuit of FIG. 1 could be used to generate the function. Instead of the input signals shown, input signals A, B, A, and C would be applied at input terminals 16, 17, 18, and 19, respectively. However, such a circuit with this connection is not satisfactory as can be understood by considering the case where all three of the input signals are 1's. In this case both of the two 6 milliampere currents will be switched to the collector connection of V3 and V6. A total of 9 milliamperes must then flow through R6 to balance the 12 milliamperes flowing from R1 and R2 less the 3 milliamperes flowing through R4. The amplitude of the output voltage at terminal 15 will then be three times as great as needed or desired. A similar excessive output voltage swing will occur at terminal 14. It is for this reason that in the prior art two successive levels would be needed to form the function $AB+AC$. Two "and" circuits would be used to form AB and AC, respectively, and then the output signals from the "and" circuits would be combined in an "or" circuit to form the indicated logical function. Actually, in this particular example, the function may be expressed as $A(B+C)$, which is equivalent to $AB+AC$. By this means $B+C$ could be formed in an "or" circuit with the output combined with A in an "and" circuit. This alternative method results in a saving of components, but two successive levels are still necessary.

Figure 2:
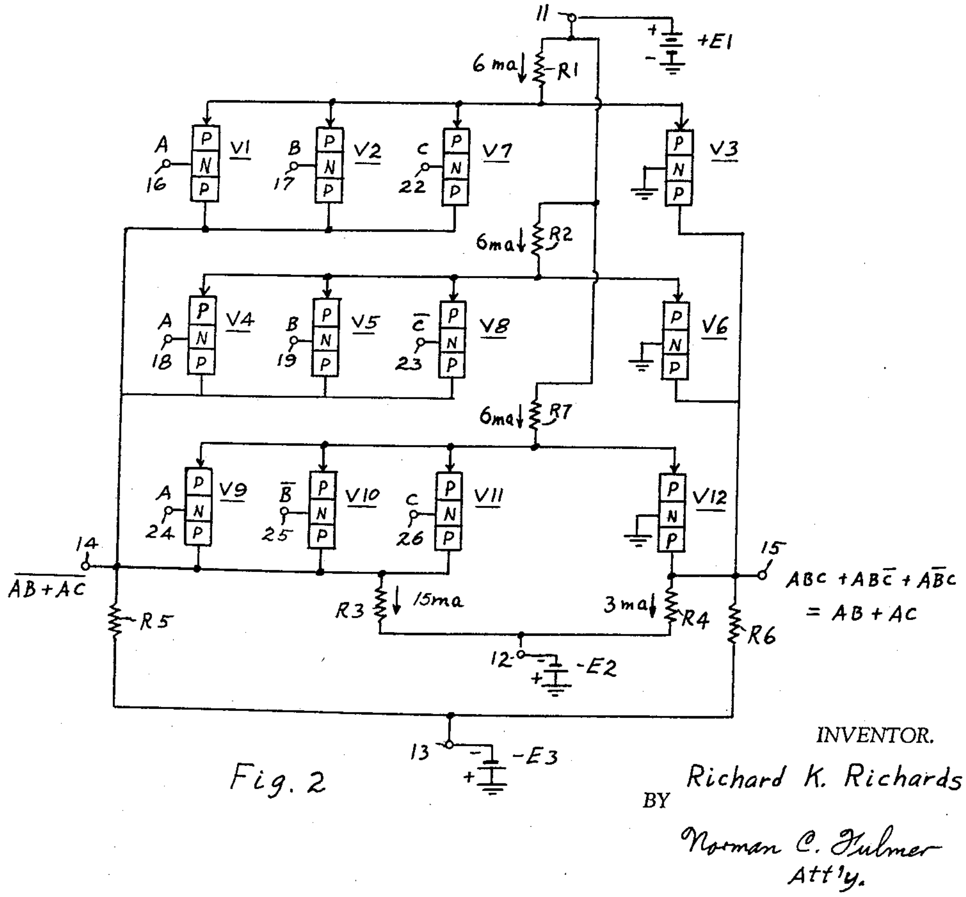
FIG. 2 shows a circuit in accordance with this invention, as applied to the logical function, $AB+AC$, as an example.

The novel and useful features of this invention can now be explained. Instead of attempting to find the simplest Boolean algebra expression for the desired switching function, the function is expanded to its elemental terms which express in detail the combinations of input variables which are to produce an output signal of 1. In the example of $AB+AC$ the resulting Boolean expression is $ABC+AB\overline{C}+A\overline{B}C$, which is equivalent to $AB+AC$. A single-level current switching circuit, in accordance with the invention and which performs this function, is shown in FIG. 2. This circuit is similar to that of FIG. 1 except that transistor V7, with base-input terminal 22, has been added in parallel with V1 and V2; transistor V8, with base-input terminal 23, has been added in parallel with V4 and V5; and a third set of transistors, V9, V10, V11, and V12 has been added. Each set of transistors is connected in a current circuit. The emitters of V9, V10, V11, and V12 are connected together and to a constant-current source of 6 milliamperes comprising resistor R7 connected to terminal 11. The collectors of V9, V10, and V11 are connected together and are connected to terminal 14. The current through resistor R3 is increased to 15 milliamperes to equal the sum of the three 6 milliampere currents from the E1 supply, less the 3 milliamperes flowing through resistor R4. The bases of V9, V10, and V11 are connected to input terminals 24, 25, and 26, respectively. The collector of V12 is connected to terminal 15, and the base of V12 is connected to ground. Binary input signals A, B, C, A, B, $\bar{C}$, A $\bar{B}$, and C are applied to terminals 16, 17, 22, 18, 19, 23, 24, 25, and 26, respectively.

With the circuit of FIG. 2, none or one (but not more than one) of the 6 milliampere currents will be switched from the left-hand side of the circuit, as presented in the figure, to the right-hand side regardless of the combination of binary input signals. For example, if A, B, and C are each 1, the 6 milliampere current from R1 will be caused to pass through V3 because each of the transistors, V1, V2, and V7 will be cut off, but at least one of the transistors in the V4—V5—V8 group will be conducting and at least one of the transistors in the V9—V10—V11 group will be conducting. Similarly, if A and B are 1 with C equal to 0, the 6 milliampere current from R2 will be caused to flow through V6, and if A and C are 1 with B equal to 0, the 6 milliampere current from R7 will be caused to flow through V12. No combination of input signal values will cause two of the 6 milliampere currents to be switched to the right-hand side. With each combination of input signal values, the potential at terminal 14 will be relatively positive or negative accordingly as the potential at terminal 11 is relatively negative or positive, respectively. The output signal at terminal 15 may be represented as $AB+AC$ although its equivalent form of $$ABC+AB\bar{C}+A\bar{B}C$$

was used in determining the circuit arrangement.

Figure 3:
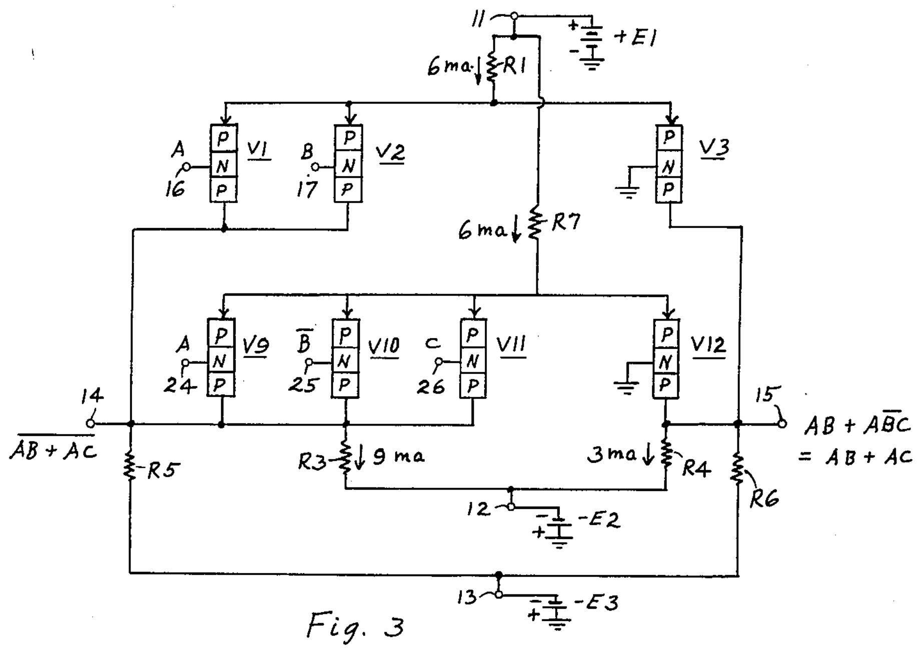
FIG. 3 shows a modified version of the circuit of the invention wherein the function $AB+AC$ is generated with fewer components than are required in the circuit of FIG. 2.

Although the circuit described above performs as required, it consumes more transistors than are necessary. The expression $ABC+AB\bar{C}+A\bar{B}C$ can be simplified to $AB+A\bar{B}C$ or to $AB\bar{C}+AC$, and either of these expressions can be translated into a single-level switching circuit. If the expression $AB+A\bar{B}C$ is arbitrarily selected for illustration, the resulting circuit is as shown in FIG. 3. The circuit of FIG. 3 is the same as the circuit of FIG. 2 except that transistors V7, V4, V5, V8, and V6 and resistor R2 have been eliminated. The output potentials at terminals 14 and 15 will be the same as in the circuit of FIG. 2 for any given combination of input signal values. Note that if A and B are 1, the 6 milliampere current from R1 will be switched through V3 regardless of the value of C. On the other hand, if A and C are 1, the 6 milliampere current from R7 will be switched through V12 only if B is 0. However, this action is satisfactory, and in fact is desired, even though the intended switching function is $AB+AC$. In the event that B is 1 when A and C are 1, the desired output potential will be generated by the switching of the current from R1 as a result of the AB term. No combination of input signals will cause both of the 6 milliampere currents to be switched. The output signal at terminal 15 may be represented as $AB+AC$ even though its equivalent form $AB+A\bar{B}C$ was used in finding the circuit.

Another procedure which may be used to minimize the number of transistors required in the single-level current-switching circuit makes use of the fact that the output signal at terminal 14 is the logical inverse of the signal at terminal 15. Because of this relationship it is possible to apply input signals in such an arrangement that the inverse of the intended function is obtained at terminal 15 with the intended function being obtained at terminal 14. It happens that in the example cited the resulting circuit so obtained requires even fewer transistors than the circuit of FIG. 3.

An expression for the inverse of a function can be obtained through Boolean algebra manipulations by any of several different procedures. One of the simplest procedures in the case of $AB+AC$ is the following:

$$\overline{AB+AC}=(\overline{AB})(\overline{AC})=(\bar{A}+\bar{B})(\bar{A}+\bar{C})=\bar{A}+\bar{B}\bar{C}$$

Figure 4:
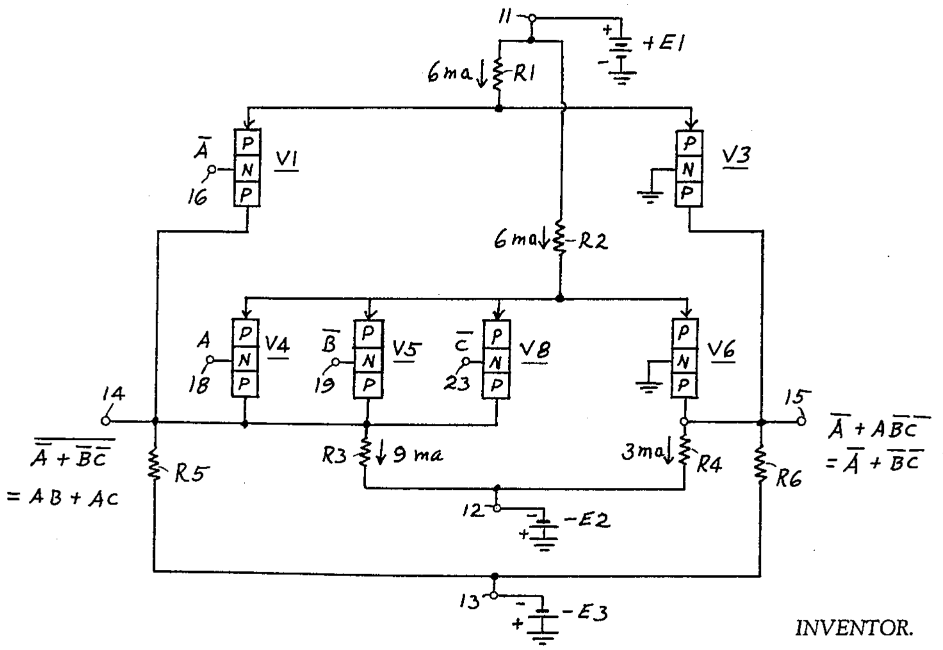
FIG. 4 shows a further modified version of the circuit of this invention wherein the function $AB+AC$ is generated with fewer components than are required in the circuit of FIG. 3.

However, $\bar{A}+\bar{B}\bar{C}$ is not directly suitable for a single-level current switching circuit for a reason similar to the reason that $AB+AC$ is not directly suitable. The reason in this case is that when A, B, and C are all 0 both the $\bar{A}$ and the $\bar{B}\bar{C}$ terms are 1 so that the output signals would be of incorrect amplitude. However, a properly functioning circuit can be developed through using the expression $\bar{A}+A\bar{B}\bar{C}$, which is equal to $\bar{A}+\bar{B}\bar{C}$. The circuit is shown in FIG. 4. It is the same as the circuit in FIG. 2 except that the transistors V2, V7, V9, V10, V11, and V12 and resistor R7 have been eliminated. Input signals representing $\bar{A}$, A, $\bar{B}$, and $\bar{C}$ are applied at terminals 16, 18, 19, and 23, respectively. Since the current from R1 is switched through V3 when $\bar{A}$ is 1 and the current from R2 is switched through V6 when $A\bar{B}\bar{C}$ is 1, the output signal at terminal 15 is represented by $\bar{A}+A\bar{B}\bar{C}$ or by its equivalent, $\bar{A}+\bar{B}\bar{C}$. The output signal at terminal 14 is its inverse, which is $AB+AC$, the desired function.

The example of $AB+AC$, which was used in FIGS. 2, 3, and 4, is to be construed as only an example of the application of this invention. In the general case, any combination of "or," "exclusive or," "and," and "not" functions can be combined into a single-level current-switching circuit by this means if the Boolean expression for it is expanded so as to represent each specific combination of input signal values that is to cause an output of 1. To cite a slightly more complex example, consider the function $A(\overline{BC+D})$. By following the principles outlined in the previous example, this expression can be altered by Boolean algebra to its equivalent, $$A\bar{B}C\bar{D}+A\bar{B}\bar{C}\bar{D}+ABC\bar{D}$$

which can in turn be translated to a single-level circuit in the same manner as before. Note, incidentally, that the expression $A\overline{BD}+AC\bar{D}$, which is also equivalent to $A(B\bar{C}+D)$, is not satisfactory for use in this application because $A\overline{BD}$ and $AC\bar{D}$ are both equal to 1 in the event that A and C are 1 with B and D equal to 0 with the result that for this combination of input signal values the amplitude of the output potentials would be greater than desired.

As another example, consider the switching function, $A\bar{B}+\bar{A}B+AC$. This form of the expression for the function is not suitable for a single-level current-switching circuit because the input signal combination of A and C equal to 1 with B equal to 0 causes both the AB and the AC terms to be equal to 1. The expression can be expanded to $ABC+A\bar{B}C+\bar{A}BC+A\bar{B}\bar{C}+\bar{A}B\bar{C}$, which shows in detail the five combinations of input signals which are to produce an output signal of 1. Although this expression is suitable for a single-level current-switching circuit, it happens in this example that an expansion to $$A\bar{B}+\bar{A}B+ABC$$

Figure 5:
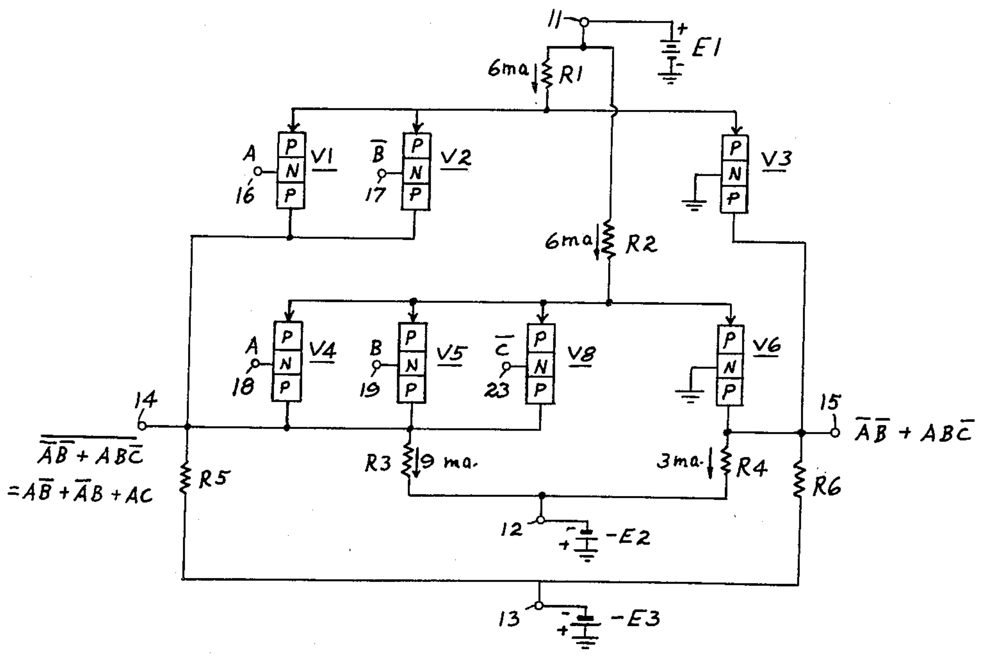
FIG. 5 shows, as another example, a version of the circuit of the invention as applied to the logical function $A\bar{B}+\bar{A}B+AC$.

(which by conventional Boolean algebra manipulations can be shown to be equal to the given expression) is sufficient to yield an expression for which no two terms are 1 for any given combination of input signal values. An alternative expression is $A\bar{B}+BC+\bar{A}B\bar{C}$. However, a further reduction in transistors can be achieved by using the inverting property of the current-switching circuit. That is, by developing an expression which is the inverse of the given function and by taking the output signal from terminal 14 instead of terminal 15, the circuit will require fewer transistors. The inverse of a function can be found in a straightforward manner by considering those terms that are not contained in the completely expanded expression for the given function. In the example cited, the three terms (of the total of eight possible with three input signals, A, B, and C) that are not present in the expanded form are $AB\overline{C}$, $\overline{A}\overline{B}C$, and $\overline{A}\overline{B}\overline{C}$. Therefore the inverse of the given function is $AB\overline{C}+\overline{A}\overline{B}C+\overline{A}\overline{B}\overline{C}$. This expression can be simplified to $\overline{A}\overline{B}+AB\overline{C}$ and still yield an expression for which no two terms are 1 for any given combination of input signal values. The resulting circuit, which is developed in the manner described previously, is shown in FIG. 5. Input variables $\overline{A}$, $\overline{B}$, A, B, and $\overline{C}$ are applied at terminals 16, 17, 18, 19, and 23, respectively. The signal representing the function $\overline{A}\overline{B}+AB\overline{C}$ then appears at output terminal 15, and the inverse of this function, which is the originally desired function of $A\overline{B}+\overline{A}B+AC$ appears at terminal 14.

In finding suitable a simplified expression for any given switching function, an organized procedure for examining all possible alternative expression is desirable. Two such procedures are presented in the Richards reference mentioned previously (see pages 58–60 and 66–69 of the reference book).

A single-level current-switching circuit has been shown which is capable of performing any combination of "or," "and," "exclusive or," and "not" functions and which is not limited to the performance of a single one of such functions. The procedures to be used for making the required interconnections in such a manner that the minimum number of transistors is employed have been explained in terms of examples. The invention is not limited to the examples shown, and one skilled in the art can apply the principles of the invention as described to alter the circuit as necessary for the performance of any complex logical function.

The principles of this invention are directly applicable to other types of components, NPN transistors in particular.

What is claimed is:

1. A current switching system for performing an AND and or an OR function involving three variables A, B and C, in a single level of switching to produce an output signal voltage of limited maximum value on a first output terminal and an inverse output signal voltage on a second output terminal, said system comprising a first current switching circuit including, a first source of constant current, a first main circuit branch and a first auxiliary circuit branch energized from said first source, said first main branch containing one electron control device having its input connected to one terminal of said first source and its output connected to said first output terminal, and said first main branch control device having a control element to receive an external digital-representative input voltage related to one of said variables, said first auxiliary branch containing one electron control device having its input connected to said first source and its output connected to said second output terminal, and said first auxiliary branch control device having a control element at a fixed ground potential; a second current switching circuit including a second source of constant current, a second main circuit branch and a second auxiliary circuit branch energized from said second source, said second main branch containing three electron control devices having their inputs connected to said second source and their outputs connected to said first output terminal, and each of said three electron control devices having a control element to receive an external digital-representative input voltage as a function of a different one of said three variables, said second auxiliary branch containing one electron control device having its input connected to said second current source and its output connected to said second output terminal and said control device in said second branch having a control element also at a fixed ground potential; a first load impedance having two terminals, with its first terminal connected to a first junction joining the outputs of said electron control device of said first main circuit branch and the outputs of the electron control devices of said second main branch at said first output terminal to establish a first output voltage on said first output terminal, a second load impedance having two terminals, with its first terminal connected to a second junction joining the output of said electron device of said first auxiliary circuit branch and the output of said electron control device of said second auxiliary branch at said second output terminal to establish a second output voltage on said second output terminal, and means connecting the second terminals of said first and second load impedances to a first common voltage point; a first balancing resistor having two terminals, with its first terminal connected to said first junction, a second balancing resistor having two terminals, with its first terminal connected to said second junction, and means connecting the second terminals of said first and second balancing resistors to a second common voltage point, the control elements of the several electron control devices in the main branch circuits being conditioned to respond to pre-selected functions of the three variables A, B and C, in a predetermined arrangement to establish a desired signal at the selected one of the two output terminals to indicate the occurrence of such pre-selected functions in the pre-determined arrangement.

2. A current switching system, as in claim 1, including a second electron control device connected in said first main circuit branch in parallel with said first electron control device, between the first current source and the first junction at the first output terminal, said second control device having a control element conditioned to receive an external digital-representative input voltage related to one of said variables other than the variable whose related voltage function is applied to said first electron control device in said first main circuit branch.

3. A current switching system, as in claim 1, including means for selectively pre-conditioning the control elements of the respective electron control devices in both of said first and second main circuit branches, so the control devices will respond only to a pre-determined combination of signal voltages related to said variables A, B and C, and the electron control devices will operate only in response to such pre-determined combination of signal voltages to cause a switching operation to develop the corresponding output signal voltage at the pre-selected one of the two output terminals.

4. A current switching system utilizing a logical circuit array for performing at least two logical functions, with A, B and C as variables, in a single level of switching, comprising a first, a second and a third current switching circuit, each switching circuit comprising a constant current source, a main branch circuit and an auxiliary branch circuit, with each main branch containing three electron control devices connected in parallel with their inputs joined and connected to one supply terminal of their respective associated constant current source, and having their outputs joined and connected to a first common junction for the outputs of all three main branch circuits, and each auxiliary branch circuit of each switching circuit containing one electron control device having its input connected to said one supply terminal of its respective associated constant current source and having its output connected to a second common junction for the outputs of all three auxiliary branch circuits, each of the three electron control devices in each of the three main branch circuits having a control element to receive an external digital-representative input voltage related to one of said three variables, respectively, and each of the three control devices in the auxiliary branch circuits having a control element at a fixed ground potential; a first output terminal; a second output terminal; means connecting the first common junction of the outputs from the three main branch circuits to said first output terminal; means connecting the second common junction of the outputs from the three auxiliary branch circuits to said second output terminal; a first load impedance having two terminals, with its first terminal connected to said first common junction of the outputs of the three main branch circuits at said first output terminal to establish a first output voltage signal on said first output terminal; a second load impedance having two terminals, with its first terminal connected to said second common junction of the outputs of the three auxiliary branch circuits at said second output terminal to establish a second output voltage signal on said second output terminal; means joining the second terminals of the two load impedances to a first common potential point; and a current balance circuit including a first balance resistor connected at one end to the first common junction at said first load impedance, and a second balance resistor connected at one end to said second common junction at said second load impedance, and means connecting the free ends of said two balance resistors to a second common potential point.

References Cited in the file of this patent

UNITED STATES PATENTS

| | | |
|---|---|---|
| 2,535,377 | Titterton | Dec. 26, 1950 |
| 2,693,907 | Tootill | Nov. 9, 1954 |

OTHER REFERENCES

"Millimicrosecond Transistor Current Switching Circuits," by Yourke in IRE Transactions on Circuit Theory, September 1957, pages 236–240.

UNITED STATES PATENT OFFICE
CERTIFICATE OF CORRECTION

Patent No. 3,016,466

January 9, 1962

Richard K. Richards

It is hereby certified that error appears in the above numbered patent requiring correction and that the said Letters Patent should read as corrected below.

Column 6, line 33, for "$A(\overline{BC+D})$" read -- $A(\overline{B\bar{C}+D})$ --; line 41, for "$A\overline{\bar{B}D}$" read -- $A\bar{B}\bar{D}$ --; line 42, for "$A(B\bar{C}+D)$" read -- $A(\overline{B\bar{C}+D})$ --; line 43, for $A\overline{BD}$" read -- $A\bar{B}\bar{D}$ --; column 7, line 38, strike out "or".

Signed and sealed this 25th day of June 1963.

(SEAL)
Attest:

ERNEST W. SWIDER
Attesting Officer

DAVID L. LADD
Commissioner of Patents